United States Patent
Yang et al.

(10) Patent No.: US 7,639,610 B2
(45) Date of Patent: Dec. 29, 2009

(54) SERVICE ADMISSION CONTROL FOR HSUPA ON E-DCH OR DCH

(75) Inventors: Tao Yang, Shanghai (CN); Mingli You, Shanghai (CN)

(73) Assignee: Alcatel Lucent, Paris (FR)

( * ) Notice: Subject to any disclaimer, the term of this patent is extended or adjusted under 35 U.S.C. 154(b) by 477 days.

(21) Appl. No.: 11/346,197

(22) Filed: Feb. 3, 2006

(65) Prior Publication Data

US 2006/0176814 A1  Aug. 10, 2006

(30) Foreign Application Priority Data

Feb. 7, 2005  (CN)  ........................ 2005 1 0023901

(51) Int. Cl.
*H04J 3/14* (2006.01)
(52) U.S. Cl. ........................ 370/230; 370/328; 370/329; 455/450
(58) Field of Classification Search ...... 370/229–236.1, 370/238, 310, 328, 329; 455/403, 422.1, 455/450

See application file for complete search history.

(56) References Cited

U.S. PATENT DOCUMENTS

| | | | | |
|---|---|---|---|---|
| 5,581,544 | A * | 12/1996 | Hamada et al. | 370/253 |
| 2001/0032262 | A1 | 10/2001 | Sundqvist | |
| 2004/0033807 | A1* | 2/2004 | Cave | 455/450 |
| 2004/0192208 | A1 | 9/2004 | Kong | |
| 2005/0207359 | A1* | 9/2005 | Hwang et al. | 370/278 |
| 2005/0249148 | A1* | 11/2005 | Nakamata et al. | 370/328 |
| 2005/0281219 | A1* | 12/2005 | Kim et al. | 370/328 |
| 2006/0039326 | A1* | 2/2006 | Jeong et al. | 370/329 |
| 2007/0076654 | A1* | 4/2007 | Bachl et al. | 370/329 |
| 2008/0043623 | A1* | 2/2008 | Franceschini et al. | 370/235 |

OTHER PUBLICATIONS

Ghosh et al, "Overview of enhanced uplink for 3GPP W-CDMA", Vehicular Technology Conference, 2004. VTC 2004—Spring. 2004 IEEE 59$^{TH}$ Milan, Italy, May 17-19, 2004, Piscataway, NJ, USA, IEEE May 17, 2004, pp. 2261-2265, XP010766561.
U.S. Appl. No. 11/346,471, filed Feb. 3, 2006, entitled "Method and System for Scheduling of Base Station for HSUPA".

* cited by examiner

*Primary Examiner*—Steven H Nguyen
*Assistant Examiner*—Obaidul Huq
(74) *Attorney, Agent, or Firm*—Fay Sharpe LLP

(57) ABSTRACT

A service admission control algorithm for HSUPA and apparatus thereof, and the algorithm describes the access control process for a new service or switching service, i.e. SRNC determines whether the service can be carried using E-DCH based on service property information; the SRNC first checks whether a base station of cell and a terminal user the service makes request for accessing support functions of HUSPA and then checks whether the cell is configured with downlink resources associated with HUSPA if the service can be carried using the E-DCH; if yes, the SRNC determines whether the service is admitted or rejected on the E-DCH based on transmission power resources required for the service and interference on the base station when transmission of the service; the SRNC continues to check whether the service can be admitted on DCH if the service is rejected on the E-DCH; if yes, the service is transmitted using the DCH; if it is rejected, the service is rejected. The present invention can enhance performance of uplink in a system and improve experience for users.

13 Claims, 2 Drawing Sheets

SERVICE ADMISSION CONTROL FOR HSUPA ON E-DCH OR DCH

CROSS-REFERENCE TO RELATED APPLICATIONS

This application is entitled to the benefit of Chinese Patent Application No. CN 200510023901.3 filed on Feb. 7, 2005 with the Chinese Patent Office.

TECHNICAL FIELD

The present invention relates to 3G (the $3^{rd}$ Generation) wireless mobile communication field, particularly to algorithm for control on uplink packet data service admission at a wireless network controller and an apparatus thereof.

BACKGROUND ART

In 3G wireless mobile communications, HSUPA (High Speed Uplink Packet Access) is dedicated to transmission of uplink packet data services, and the object thereof is to enhance performance of uplink in a system and improve experience for users. In order to achieve the object, some new techniques are used in transmission of HSUPA, including control process based on a base station, HARQ (Hybrid Automatic Repeat Request) retransmission mode and short transmission interval (2 ms) and etc.

RRM (Radio Resource Management) is significantly important for ensuring performance of a wireless system, therefore, the RRM algorithm for HSUPA is a significantly important content in a HSUPA normalizing process.

In order to achieve transmission of HSUPA, SRNC (Serving Radio Network Controller) allocates radio resources available to HSUPA transmission. Meanwhile, in order to maintain receiving quality of Node B (base station), it shall be ensured that HSUPA can not produce too many interferences at the base station, so SRNC will configure a threshold for interference to ensure that the transmission of HSUPA can not have too many negative effects on other services. Therefore, before transmission of packet service HSUPA is achieved, SRNC will make a decision whether the service is permitted to be accessed in a current transmission environment or not, i.e. SRNC shall ensure that the provided resources can meet demand for the transmission of service, and the transmission of service can not lead to a large burden for the present network. That is, before HSUPA transmission of packet service, admission control process for the service shall be performed.

Although there are a number of researches and conclusions for radio resource management algorithm directed to DCH (dedicated channel), the new technique used for E-DCH (Enhanced dedicate channel) transmission leads to E-DCH having its own unique property, so the radio resource management algorithm directed to DCH can not be directly used for E-DCH transmission. Meanwhile, since HSUPA is used for uplink data transmission, together with limit for terminal transmission power, there is not limit for channel codes but for power resource, which is significantly distinguishing with downlink transmission. Therefore, according to property of HSUPA, it is very necessary to study a radio resource management algorithm suitable to the property of HSUPA, i.e. a service admission control algorithm for HSUPA.

CONTENT OF THE INVENTION

The object of the present invention is to provide a service admission control algorithm for HSUPA and apparatus thereof in order to enhance performance of uplink in a system and improve experience for users.

The present invention provides a service admission control algorithm for HSUPA, and the access control steps for a new service or switching service are: SRNC determining whether the service can be carried using E-DCH based on service property information; the SRNC first checking whether a base station of cell and a terminal user the service makes request for accessing support functions of HUSPA and then checking whether the cell is configured with downlink resources associated with HUSPA if the service can be carried using the E-DCH; if yes, the SRNC determining whether the service is admitted or rejected on the E-DCH based on transmission power resources required for the service and interference on the base station when transmission of the service; the SRNC continuing to check whether the service can be admitted on DCH if the service is rejected on the E-DCH; if yes, transmitting the service using the DCH; if it is rejected, rejecting the service.

In the above service admission control algorithm for HSUPA, when a new service and a switching service come at the same time, the SRNC first performs processing on the one with higher priority based on different priorities assigned for the switching service and the new service.

In the above service admission control algorithm for HSUPA, the service property information includes demand on time delay of the service and the type of the service.

In the above service admission control algorithm for HSUPA, the type of the service includes real-time service, stream-type service, interactive-type service and background-type service.

In the above service admission control algorithm for HSUPA, if the type of the new service or switching service is real-time service or stream-type service with the demand that time delay is less than a preset value, the service is carried by the DCH.

In the above service admission control algorithm for HSUPA, if the type of the new service or switching service is stream-type service, interactive-type service or background-type service with the demand that time delay is greater than a preset value, the service is first carried by the E-DCH and then it is considered to be carried by the DCH.

In the above service admission control algorithm for HSUPA, if the terminal and the base station supports functions of HSUPA and the associated downlink resources have already assigned for the cell to be required to access, it can be considered to admit the service on the E-DCH of the cell when the following conditions are satisfied at the same time: 1) the SRNC has configured the resources for HSUPA transmission; 2) one type of channel resources of E-AGCH and E-RGCH have been configured; 3) resources of E-HICH shall have been configured for the cell with only resources of E-AGCH configured; 4) associated signing resources have been configured for HSUAP transmission.

In the above service admission control algorithm for HSUPA, the SRNC determines whether the transmission power required for the new service or the switching service exceeds the maximum transmission power of the terminal according to the following equation:

$$P_{target} = \frac{N_t \cdot SIR_{target}}{\frac{W}{R_{GBR}}} \cdot L_{path} \qquad (1)$$

$$P_{target} < P_{UE}^{max} \qquad (2)$$

wherein $N_t$ is background noise, $R_{GBR}$ is guarantee bit rate of service, W is chip rate, $SIR_{target}$ is target signal-interference-ratio of service, $L_{path}$ is current transmission path loss, $P_{target}$ is the required transmission power when the guarantee bit rate and the target signal-interference-ratio of service are ensured in an ideal network environment, $P_{UE}^{max}$ is the maximum transmission power of the terminal;

if condition (2) is satisfied, it can be considered to admit the service on the E-DCH of the cell.

In the above service admission control algorithm for HSUPA, if the SRNC directly assigns power resources $P_{SRNC}^{E-DCH}$ for the E-DCH, then in the current network environment, the transmission power of the E-DCH $P_{E-DCH}$ required for ensuring demand on quality of the service is:

$$P_{E-DCH} = \frac{(N_t + I_{inter-cell} + I_{intra-cell}) \cdot SIR_{target}}{\frac{W}{R_{GBR}} \cdot L_{path}} \quad (3)$$

$$P_{E-DCH} \leq P_{SRNC}^{E-DCH} \quad (4)$$

wherein $I_{inter-cell}$ is interference between cells, $I_{intra-cell}$ is interference of other users on the service in a cell, $P_{SRNC}^{E-DCH}$ is power resource assigned to the E-DCH for use by the SRNC. If condition (4) is satisfied, it can be considered to admit the service on the E-DCH of the cell; otherwise the SRNC attempts to admit the service on the DCH.

In the above service admission control algorithm for HSUPA, if the SRNC assigns the total power $P_{SRNC}^{E-DCH+DCH}$ for the DCH and the E-DCH, then in the current network environment, the transmission power of the E-DCH $P_{E-DCH}$ required for ensuring demand on quality of the service is obtained by equation (3), and then there is a condition (5):

$$P_{E-DCH} \leq P_{SRNC}^{E-DCH+DCH} - P_{DCH} \quad (5)$$

wherein $P_{DCH}$ is transmission power occupied by the current DCH. If condition (5) is satisfied, it can be considered to admit the service on the E-DCH of the cell; otherwise the SRNC attempts to admit the service on the DCH.

The present invention also provides a service admission control apparatus for HSUPA, characterized in that it comprises a resource configuration module, a terminal originating service request module, an acquiring service and terminal property information module and a service admission control module respectively connected thereto, wherein the resource configuration module is configured for radio resources of HSUPA transmission and for configuring associated threshold parameters; the terminal originating service request module is used for terminal-originating service request and transferring service and terminal-associated information to a wireless network controller; the acquiring service and terminal property information module is used for acquiring property of service and terminal; the service admission control module is used for determining whether to admit a new service or a switching service based on the property of service and terminal.

The present invention has proposed a service admission control algorithm with the feature of HSUPA for the first time, having the following features:

1) It is determined whether the service is admitted on the E-DCH or the DCH based on the property of the service. The service with the demand that time delay is less than a set value. It is first considered to be carried on the E-DCH to enhance performance of the system for the service with the demand that time delay is greater than a set value. If admission on the E-DCH fails, it is then considered to be admitted on the DCH to obtain higher performance of uplink transmission while enhancing probability of successful service access.

2) If the service is admitted on the E-DCH, the SRNC first detects whether the terminal and the base station supports functions of HSUPA, which conforms to actuality of network evolvement.

3) In the process of service admission, it shall be checked whether the cell required to access has been configured with associated resources of HSUPA. Only in case that all the following conditions are satisfied, it can be considered that the service is admitted on the E-DCH.

a) at least one type of channel resources of E-AGCH (Absolute Command Channel) and E-RGCH (Relative Command Channel) have been assigned;

b) the cell with E-HICH (HARQ Feedback Indication Channel) shall have been assigned for the cell with only resources of E-AGCH assigned;

c) associated signing resources shall be assigned for HSUAP transmission.

4) The solution of assigning resources for the E-DCH by the SRNC contains two selections: resources are assigned singly for the E-DCH, the total resources are assigned for E-DCH+DCH.

5) The present invention considers the feature that the HSUPA data packet transmission is divided into two steps with sufficient consideration for impact of transmission of data packets and signaling on the base station, so that negative effects on the system generated by service admission are decreased to the lowest.

MODE OF CARRYING OUT THE INVENTION

Figure 2:
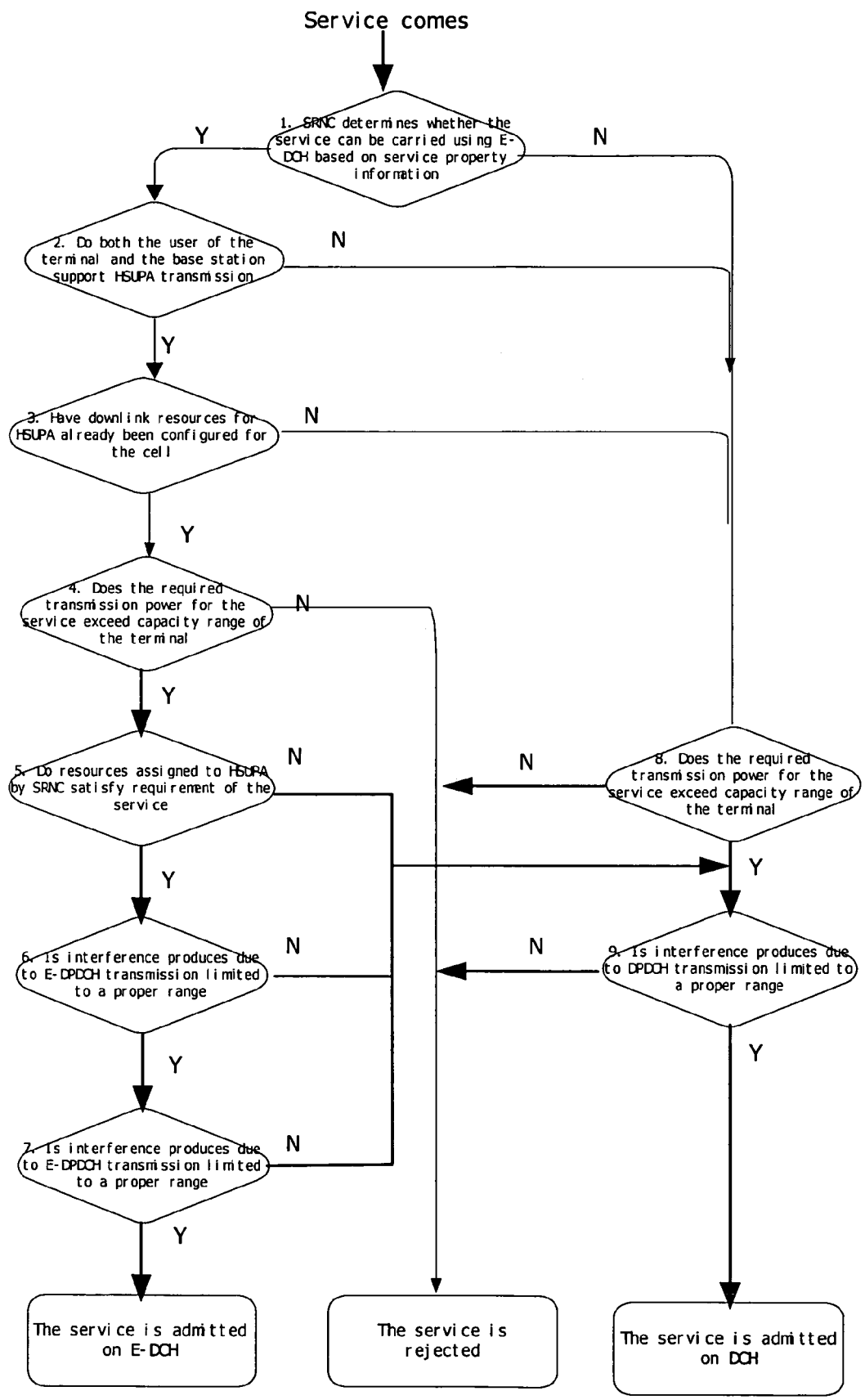
FIG. 2 is a flow chart of an algorithm of the present invention.

As shown in FIG. 2, the service admission control algorithm for HSUPA of the present invention substantially considers the features of HSUPA. A whole process is directed to new-coming services and the same steps are used for switching services.

1) After HSUPA transmission mode is introduced, there may be two kinds of transmission channels in a cell: E-DCH or DCH. HSUPA is mainly used for transmission of packet data services with not high demand on time delay and using HSUPA will significantly enhance performance of system, which indicates packet data services can be carried by either E-DCH or DCH, which shall be considered when the service is accessed to enhance success ratio for service access. For this feature, when a new service comes, the SRNC determines whether the service can be carried using E-DCH based on service property information such as demand on time delay of the service and type of the service. At present, 3GPP defines four basic types of service: real-time-type service, stream-type service, interactive-type service and background-type service. The present invention defines the following rules:

1.1) If the new service is a real-time-type service or stream-type service with the demand that time delay is less than a preset value, the service can be only carried by the DCH, then the process skips to Step 8).

1.2) if the new service is a stream-type service, a interactive-type service or a background-type service with the demand that time delay is greater than a preset value, the SRNC first performs service access control on the E-DCH and the process skips to Step 2).

2) Since HSUPA is the technique introduced in R6 (Release 6), there exists some cells supporting HSUPA and some cells not supporting HSUPA transmission. For the same reasons, there exists some terminals supporting functions of HSUPA and some terminals not. It shall be considered in the service admission process. For this point, the SRNC shall detect whether the user of the terminal and the base station support functions of HSUPA, and if both support the functions, it can be considered to admit the service on the E-DCH. The process turns to Step 3). Otherwise, if at least one of the terminal and the base station does not support functions of HUSPA, it only can be considered to carry the service on the DCH and the process skips to Step 8).

3) Although the HSUPA is an uplink packet service transmission process, it needs cooperation with downlink transmission. That is, in order to implement transmission of HUSPA, the SRNC shall assign associated downlink resources to the cell. In the service admission process, for the cells supporting functions of HSUPA, it shall be checked whether the associated downlink resources have been assigned for HSUPA when network planning. For this point, the SRNC checks whether downlink resources for HSUPA, e.g. channel resources such as E-HICH, E-RGCH, E-AGCH, signing resources and etc., have already been configured for the cell required to access for the new service. The present invention defines the following rules:

3.1) if the terminal and the base station supports functions of HSUPA and the associated downlink resources have already assigned for the cell to be required to access, it can be considered to admit the service on the E-DCH of the cell when the following conditions are satisfied at the same time, and the process skips to Step 4):

3.1.1) the SRNC has configured the resources for HSUPA transmission;

3.1.2) one type of channel resources of E-AGCH and E-RGCH have been configured;

3.1.3) resources of E-HICH shall have been configured for the cell with only resources of E-AGCH configured;

3.1.4) associated signing resources have been configured for HSUAP transmission.

3.2) As long as one of the following is satisfied, the SRNC only attempts to access the service on the DCH and the process skips to Step 8):

3.2.1) the SRNC has not configured the resources for HSUPA transmission;

3.2.2) at least the system has not configured one type of channel resources of E-AGCH and E-RGCH for the cell required to access for the service;

3.1.3) resources of E-HICH have not been configured for the cell with only resources of E-AGCH configured;

3.1.4) associated signing resources have not been configured for HSUAP transmission.

4) Based on difference types of the terminals, the maximum transmission power thereof is limited, therefore, demand of any service on the transmission power can not exceed the maximum transmission power acceptable for the terminal. For this point, the SRNC checks whether the required transmission power exceeds the maximum transmission power of the terminal in the case of ensure QOS (quality of service) of the new service.

$$P_{target} = \frac{N_t \cdot SIR_{target}}{\frac{W}{R_{GBR}} \cdot L_{path}} \qquad (1)$$

$$P_{target} < P_{UE}^{max} \qquad (2)$$

The determination is made in an ideal network environment, i.e. without interference between cells and interference of other user within the cell. The reason why the step is performed in an ideal network environment is that the transmission power required for achieving a target QOS at such an environment. In an actual process of transmission, it can be by reasonable scheduling of the base station to ensure achievement of target QOS of the service. Therefore, this contributes to enhancing probability of successful access of the service. If the maximum transmission power can not satisfy the demand of the service in an ideal network environment, the service will be rejected to access. In Equation (1), $N_t$ is background noise, which is processed by statistics and reported to the SRNC, $R_{GBR}$ is guarantee bit rate of service, which is obtained by a service QOS parameter table (if there is no guarantee bit rate in the QOS parameters, it is replaced with the maximum bit rate), W is chip rate, $SIR_{target}$ is target signal-interference-ratio of service, which is provided by the QOS parameter table, $L_{path}$ is current transmission path loss, $P_{target}$ is the required transmission power when the guarantee bit rate and the target signal-interference-ratio of service are ensured in an ideal network environment, $P_{UE}^{max}$ is the maximum transmission power of the terminal which is determined by the parameter of terminal type. Therefore, if condition (2) is satisfied, the process skips to Step 5); otherwise, the request for access of the service is rejected.

According to decision of 3GPP, in the process of HSUPA transmission, there are two solutions for the number of radio resources available to HUSPA transmission configured by the SRNC at present:

The SRNC assigns a total power for transmission of DCH and E-DCH, and the base station determines the amount of power for E-DCH according to particular circumstances.

The SRNC only assigns the power for transmission of E-DCH, i.e. the portion of power only can be used for HSUPA.

5) At present, it have not been determined which solution is used, but it will have an effect on the process of service access. Therefore, the process of service access shall comprehensively consider the two points. For this feature, the SRNC shall check whether radio resources required for the process of service access exceed the ones assigned for HSUPA by the SRNC. This step is used for detecting whether the power resource assigned to the E-DCH by the SRNC can satisfy requirement of the service, i.e. whether it can satisfy the target value of QOS of the service, in the current network environment. Since there are two solutions to assign the power resource to the E-DCH by the SRNC, different processing is performed in the process of service admission:

5.1) The SRNC directly assigns power resources $P_{SRNC}^{E-DCH}$ for the E-DCH, then in the current network environment, the transmission power of the E-DCH $P_{E-DCH}$ required for ensuring demand on QOS is:

$$P_{E-DCH} = \frac{(N_t + I_{inter-cell} + I_{intra-cell}) \cdot SIR_{target}}{\frac{W}{R_{GBR}} \cdot L_{path}} \qquad (3)$$

$$P_{E-DCH} \leq P_{SRNC}^{E-DCH} \qquad (4)$$

wherein $I_{inter-cell}$ is interference between cells, $I_{intra-cell}$ is interference of other users on the service in a cell, which is obtained in a process of measurement. Other parameters are the same as above. $P_{SRNC}^{E-DCH}$ is power resource assigned to the E-DCH for use by the SRNC. If condition (4) is satisfied, the process skips to Step 6). If condition (4) is not satisfied, the service can not be carried by the E-DCH, and then the SRNC attempts to admit the service on the DCH. The process turns to Step 9).

5.2) The SRNC assigns the total power $P_{SRNC}^{E-DCH+DCH}$ for the DCH and the E-DCH, then in the current network environment, the transmission power of the E-DCH $P_{E-DCH}$ required for ensuring demand on quality of the service is obtained by equation (3), and then there is a condition (5):

$$P_{E-DCH} \leq P_{SRNC}^{E-DCH+DCH} - P_{DCH} \quad (5)$$

wherein $P_{DCH}$ is transmission power occupied by the current DCH. If condition (5) is satisfied, the process turns to Step 6); otherwise the SRNC attempts to admit the service on the DCH, and the process turns to Step 9).

6) The HSUAP transmission is a two-step transmission process: at first, the terminal transmits information required for demodulation of data at the base station to the base station through a signaling channel E-DPCCH (Enhanced Dedicated-Control physical Channel). Then, the terminal transmits data packets to the base station through a service channel E-DPDCH (Enhanced Dedicated-Data physical Channel). The base station performs processing on the data of the service channel based on the previously received signaling information to implement the process of HSUPA transmission. In the two-step transmission process, the user of the terminal shall use a proper transmission power under the condition of ensuring requirement of service QOS, so that the interference (ROT: rise over noise) produced at the base station due to transmission of the E-DPCCH and the E-DPDCH is limited to a certain range and the interference on other service being transmitted is decreased to the most. For this point, the processing of Step 6) is firstly performed. Step 6) is performed for ensuring that the ROT (Rise Over Noise) of transmission of the data packets at the base station is limited to a certain range. According to the definition to the ROT, there exists:

$$ROT = \frac{I_{total}}{N_t} \quad (6)$$

wherein $I_{total}$ is a total receiving power measured at the base station. Then an uplink load factor of the user of the terminal can be calculated as:

$$L_j = \frac{1 + f_{ul}}{1 + \frac{W}{SIR_{target} \times R_{GBR}}} \quad (7)$$

wherein the parameter $$f_{ul} = \frac{I_{inter-cell}}{I_{intra-cell}}$$

is a ratio of interference between cells to that with cell. Then the power of the jth user of terminal received by the base station can be calculated as:

$$P_j = L_j \times I_{total} \quad (8)$$

Meanwhile, the uplink load factor of the whole cell can be calculated as:

$$\eta_{UL} = \sum_{j=1}^{K} L_j \quad (9)$$

The parameter K is the number of the current active users of terminal. Then, the interference produced due to information transmission at the base station for all the users can be obtained as:

$$ROT = \frac{I_{total}}{P_N} \quad (10)$$
$$= \frac{I_{total}}{I_{total} - I_{total} \times \sum_{j=1}^{k} L_j}$$
$$= \frac{1}{1 - \eta_{UL}}$$

In order to ensure performance of the system, the ROT of the base station shall be limited to a range specified by the SRNC. To facilitate discussion, set $ROT_{old}$ as the ROT measured at the base station prior to access of the new service, and assume that change of the ROT due to data transmission of the new service at the base station is $\Delta_{ROT}$. According to rules for differentiation, there exists:

$$\Delta_{ROT} = \frac{\Delta ROT}{\Delta \eta_{UL}} \quad (11)$$
$$\approx \frac{dROT}{d\eta_{UL}} \Leftrightarrow \Delta_{ROT}$$
$$\approx \frac{dROT}{d\eta_{UL}} \Delta \eta_{UL}$$
$$= \frac{d\left(\frac{1}{1-\eta_{UL}}\right)}{d\eta_{UL}} \Delta \eta_{UL}$$
$$= \frac{\Delta \eta_{UL}}{(1-\eta_{UL})^2}$$

In order to ensure performance of the system, the follow condition shall be satisfied:

$$ROT_{old} + \Delta_{ROT} < ROT_{th1} \quad (12)$$

$ROT_{th1}$ is a configured threshold for ROT, and then when condition (12) is satisfied, the process turns to Step 7); otherwise, the SRNC attempts to admit the service on the DCH, and the process turns to Step 9).

7) Since the process of HSUPA transmission is divided into two steps, the SRNC shall ensure that ROT produced due to signaling transmission at the base station is limited to a proper range. That is, the SRNC shall ensure that ROT produced due to transmission of the E-DPCCH at the base station is limited to a certain range. For this point, the same processing as Step 6) can be used to ensure that the ROT produced due to transmission of the E-DPCCH is limited to a certain range. If condition (11) is satisfied, then it means that the service can be carried by the E-DCH and the process ends; otherwise, the SRNC attempts to admit the new service on the DCH, and the process turns to Step 9).

8) Since in the cell supporting HSUPA, the packet service can be carried by either E-DCH or DCH. For this point, if carrying on the E-DCH is rejected, then the SRNC attempts to perform admission on the DCH. Or, for the cell or terminal not supporting HSUPA, it only can attempt to perform admission on the DCH. Therefore, it is firstly determined whether the power required for the service exceeds the maximum transmission power of the terminal. This step is the same as Step 3), and if condition 3) is satisfied, the process turns to Step 9); otherwise, the new service is rejected.

9) As such, transmission of packet service on the DCH also shall ensure that the interference thereof produced at the base station is limited to a certain range. For this point, the processing of Step 9) is performed. This step is the same as Step 6), i.e. contribution of ROT of the base station when the service is carried at the DCH is determined. If condition (11) is satisfied, the service is admitted on the DCH; otherwise, the service is rejected. The whole admission process ends.

Figure 1:
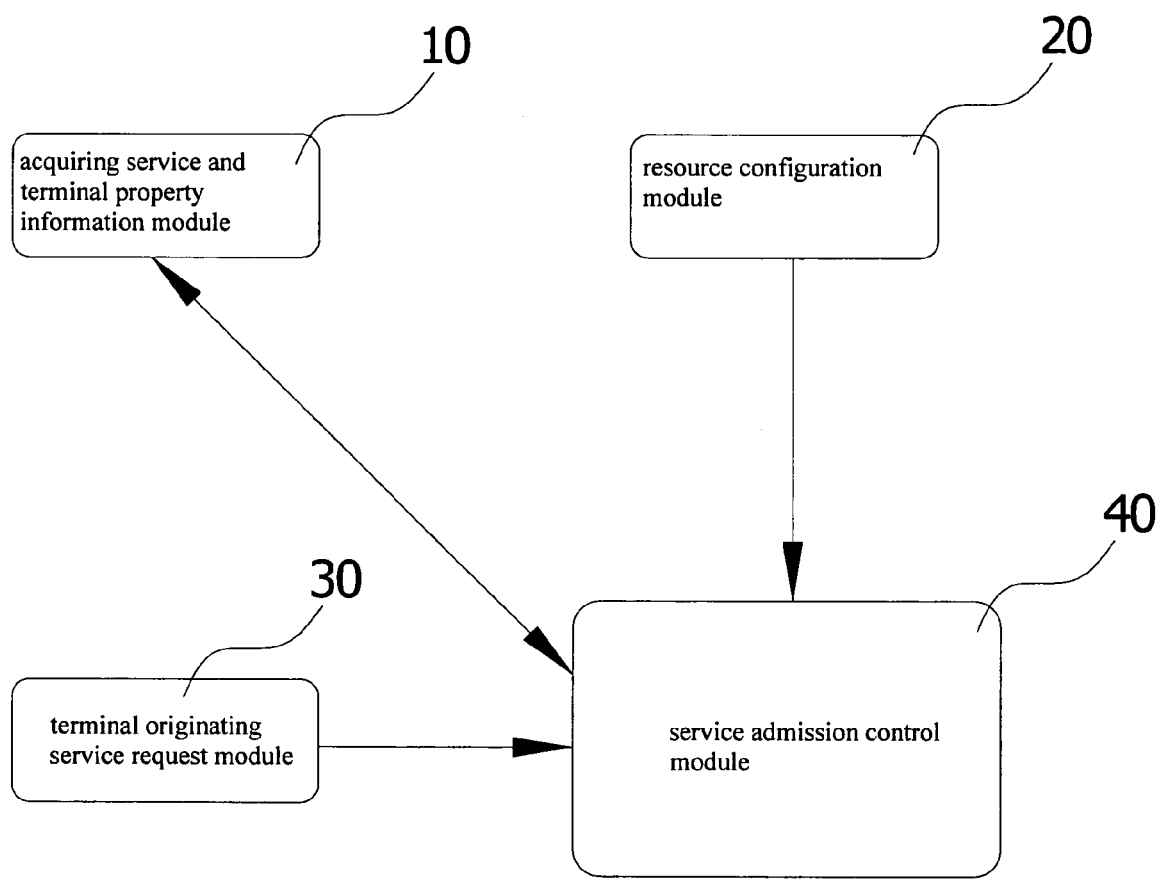
FIG. 1 is a structure schematic diagram of an apparatus of the present invention.

As shown in FIG. 1, the present invention provides a service admission control apparatus for HSUPA, comprising a resource configuration module 20, a terminal originating service request module 30, an acquiring service and terminal property information module 10 and a service admission control module 40 respectively connected thereto, wherein:

the resource configuration module 20 is configured for radio resources of HSUPA transmission and for configuring associated threshold parameters;

the terminal originating service request module 30 is used for terminal-originating service request and transferring service and terminal-associated information to a wireless network controller;

the acquiring service and terminal property information module 10 is used for acquiring property of service and terminal;

the service admission control module 40 is used for determining whether to admit a new service or a switching service based on the property of service and terminal.

The above embodiments of the present invention have been presented by way of example only, and not limitation. It should be noted that various changes and modifications could be made by those skilled in the art herein without departing from the sprit and scope of the invention. Therefore, all equivalent technical solutions should belong to the scope of the present invention which should be limited by the attached claims.

What we claim:

1. A service admission control algorithm for High Speed Uplink Packet Access (HSUPA) having access control steps for a new service or switching service comprising:

Serving Radio Network Controller (SRNC) determining whether the service can be carried using Enhanced Dedicated Channel (E-DCH) based on service property information;

the SRNC first checking whether a base station of cell and a terminal using the service makes request for accessing support functions of HSUPA and then checking whether the cell is configured with downlink resources associated with HSUPA if the service can be carried using the E-DCH, if yes, the SRNC determining whether the service is admitted or rejected on the E-DCH based on transmission power resources required for the service and interference on the base station during transmission of the service; and the SRNC continuing to check whether the service can be admitted on Dedicated Channel (DCH) if the service is rejected on the E-DCH, if yes, transmitting the service using the DCH, if it is rejected, rejecting the service.

2. The service admission control algorithm for HSUPA as claimed in claim 1, wherein when a new service and switching service come at the same time, the SRNC first performs processing on the one with higher priority based on different priorities assigned for the switching service and the new service.

3. The service admission control algorithm for HSUPA as claimed in claim 1, wherein the service property information includes demand on time delay of the service and type of the service.

4. The service admission control algorithm for HSUPA as claimed in claim 3, wherein the type of the service includes real-time service, stream-type service, exchange-type service and background-type service.

5. The service admission control algorithm for HSUPA as claimed in claim 4, wherein if the type of the new service or switching service is real-time service or stream-type service with the demand that time delay is less than a preset value, the service is carried by the DCH.

6. The service admission control algorithm for HSUPA as claimed in claim 4, wherein if the type of the new service or switching service is stream-type service, exchange-type service or background-type service with the demand that time delay is greater than a preset value, the service is first considered to be carried by the E-DCH and then it is considered to be carried by the DCH.

7. The service admission control algorithm for HSUPA as claimed in claim 1, wherein if the terminal and the base station supports functions of HSUPA and the associated downlink resources have already assigned for the cell to be required to access, it can be considered to admit the service on the E-DCH of the cell when the following conditions are satisfied at the same time: 1) the SRNC has configured the resources for HSUPA transmission; 2) one type of channel resources of Absolute Command Channel (E-AGCH) and Relative Command Channel (E-RGCH) have been configured; 3) resources of Hybrid Automatic Repeat Request (HARQ) Feedback Indication Channel (E-HICH) shall have been configured for the cell with only resources of E-AGCH configured; 4) associated signing resources have been configured for HSUPA transmission.

8. The service admission control algorithm for HSUPA as claimed in claim 1, wherein:

the SRNC determines whether the transmission power required for the new service or the switching service exceeds the maximum transmission power of the terminal according to the following equation:

$$P_{target} = \frac{N_t \cdot SIR_{target}}{\frac{W}{R_{GBR}} \cdot L_{path}} \quad (1)$$

$$P_{target} < P_{UE}^{max} \quad (2)$$

wherein $N_t$ is background noise, $R_{GBR}$ is guarantee bit rate of service, W is chip rate, $SIR_{target}$ is target signal-interference-ratio of service, $L_{path}$ is current transmission path loss, $P_{target}$ is the required transmission power when the guarantee bit rate and the target signal-interference-ratio of service are ensured in an ideal network environment, $P_{UE}^{max}$ is the maximum transmission power of the terminal; and if condition (2) is satisfied, it can be considered to admit the service on the E-DCH of the cell.

9. The service admission control algorithm for HSUPA as claimed in claim 1, wherein if the SRNC directly assigns power resources $P_{SRNC}^{E-DCH}$ for the E-DCH, then in the current network environment, the transmission power of the E-DCH $P_{E-DCH}$ required for ensuring demand on quality of the service is:

$$P_{E-DCH} = \frac{(N_t + I_{inter-cell} + I_{intra-cell}) \cdot SIR_{target}}{\frac{W}{R_{GBR}} \cdot L_{path}} \quad (3)$$

$$P_{E-DCH} \leq P_{SRNC}^{E-DCH} \quad (4)$$

wherein $I_{inter-cell}$ is interference between cells, $I_{intra-cell}$ is interference of other users on the service in a cell, $P_{SRNC}^{E-DCH}$ is power resource assigned to the E-DCH for use by the SRNC; and if condition (4) is satisfied, it can be considered to admit the service on the E-DCH of the cell; otherwise the SRNC attempts to admit the service on the DCH.

10. The service admission control algorithm for HSUPA as claimed in claim 1, wherein:

if the SRNC assigns the total power $P_{SRNC}^{E-DCH+DCH}$ for the DCH and the E-DCH, then in the current network environment, the transmission power of the E-DCH $P_{E-DCH}$ required for ensuring demand on quality of the service is obtained by equation (3), and then there is a condition (5):

$$P_{E-DCH} \leq P_{SRNC}^{E-DCH+DCH} - P_{DCH} \quad (5)$$

wherein $P_{DCH}$ is transmission power occupied by the current DCH; and if condition (5) is satisfied, it can be considered to admit the service on the E-DCH of the cell, otherwise the SRNC attempts to admit the service on the DCH.

11. A service admission control apparatus for High Speed Uplink Packet Access (HSUPA) comprising:

a service admission control module structure connected to each of a resource configuration module structure, a terminal originating service request module structure, and an acquiring service and terminal property information module structure, wherein:

the resource configuration module structure is configured for radio resources of HSUPA transmission and for configuring associated threshold parameters;

the terminal originating service request module structure is used for terminal-originating service request and transferring service and terminal-associated information to a wireless network controller;

the acquiring service and terminal property information module structure is used for acquiring property of service and terminal; and the service admission control module structure is used for determining whether to admit a new service or a switching service on an Enhanced Dedicated Channel (E-DCH) based on transmission power resources required for the service and interference on a base station during transmission of the service, wherein the service admission control module structure determines to admit a new service or a switching service if the transmission power required for the new service or the switching service exceeds the maximum transmission power of the terminal according to the following equation:

$$P_{target} = \frac{N_t \cdot SIR_{target}}{\frac{W}{R_{GBR}} \cdot L_{path}} \quad (1)$$

$$P_{target} < P_{UE}^{max} \quad (2)$$

wherein $N_t$ is background noise, $R_{GBR}$ is guarantee bit rate of service, W is chip rate, $SIR_{target}$ is target signal-interference-ratio of service, $L_{path}$ is current transmission path loss, $P_{target}$ is the required transmission power when the guarantee bit rate and the target signal-interference-ratio of service are ensured in an ideal network environment, $P_{UE}^{max}$ is the maximum transmission power of the terminal.

12. The service admission control apparatus of claim 11 wherein the service admission control apparatus directly assigns power resources $P_{SRNC}^{E-DCH}$ for the E-DCH and the transmission power of the E-DCH $P_{E-DCH}$ required for ensuring demand on quality of the service is:

$$P_{E-DCH} = \frac{(N_t + I_{inter-cell} + I_{intra-cell}) \cdot SIR_{target}}{\frac{W}{R_{GBR}} \cdot L_{path}} \quad (3)$$

$$P_{E-DCH} \leq P_{SRNC}^{E-DCH} \quad (4)$$

wherein $I_{inter-cell}$ is interference between cells, $I_{intra-cell}$ is interference of other users on the service in a cell, $P_{SRNC}^{E-DCH}$ is power resource assigned to the E-DCH for use by the SRNC; and the service admission control module structure determines to admit the new service or switching service on the E-DCH of the cell if condition (4) is satisfied otherwise it attempts to admit the service on the DCH.

13. A service admission control apparatus for High Speed Uplink Packet Access (HSUPA) comprising:

a service admission control module structure connected to each of a resource configuration module structure, a terminal originating service request module structure, and an acquiring service and terminal property information module structure, wherein:

the resource configuration module structure is configured for radio resources of HSUPA transmission and for configuring associated threshold parameters;

the terminal originating service request module structure is used for terminal-originating service request and transferring service and terminal-associated information to a wireless network controller;

the acquiring service and terminal property information module structure is used for acquiring property of service and terminal; and the service admission control module structure is used for determining whether to admit a new service or a switching service on an Enhanced Dedicated Channel (E-DCH) based on transmission power resources required for the service and interference on a base station during transmission of the service, wherein the service admission control module structure determines to admit a new service or a switching service if a terminal and a base station supports functions of HSUPA and the associated downlink resources have already assigned for a cell to be required to access, it can be considered to admit the service on the E-DCH of the cell when the following conditions are satisfied at the same time: 1) the SRNC has configured the resources for HSUPA transmission; 2) one type of channel resources of Absolute Command Channel (E-AGCH) and Relative Command Channel (E-RGCH) have been configured; 3) resources of Hybrid Automatic Repeat Request (HARQ) Feedback Indication Channel (E-HICH) shall have been configured for the cell with only resources of E-AGCH configured; and 4) associated signing resources have been configured for HSUPA transmission.

* * * * *

UNITED STATES PATENT AND TRADEMARK OFFICE
CERTIFICATE OF CORRECTION

PATENT NO.       : 7,639,610 B2                                    Page 1 of 1
APPLICATION NO. : 11/346197
DATED            : December 29, 2009
INVENTOR(S)      : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 806 days.

Signed and Sealed this

Twenty-first Day of December, 2010

David J. Kappos
*Director of the United States Patent and Trademark Office*